United States Patent [19]
Brown et al.

[11] Patent Number: 5,609,674
[45] Date of Patent: Mar. 11, 1997

[54] MITIGATION OF DYE CRYSTALLIZATION IN IMAGES ON TRANSPARENCIES AND GLOSSY MEDIA

[75] Inventors: Roger A. Brown, Carlsbad, Calif.; Hiang Lauw; Loren E. Johnson, both of Corvallis, Oreg.

[73] Assignee: Hewlett-Packard Company, Palo Alto, Calif.

[21] Appl. No.: 566,247

[22] Filed: Dec. 1, 1995

[51] Int. Cl.$^6$ .................................................. C09D 11/02
[52] U.S. Cl. ................. 106/22 R; 106/22 H; 106/22 K; 106/20 D
[58] Field of Search ........................... 106/22 R, 22 H, 106/20 D, 22 K

[56] References Cited

U.S. PATENT DOCUMENTS

| | | | |
|---|---|---|---|
| 4,554,555 | 11/1985 | Aruga et al. | 106/20 D |
| 5,143,547 | 9/1992 | Kappele | 106/22 R |
| 5,185,034 | 2/1993 | Webb et al. | 106/22 R |
| 5,196,056 | 3/1993 | Prasad | 106/20 D |
| 5,501,725 | 3/1996 | Lauw et al. | 106/22 B |

*Primary Examiner*—Helene Klemanski

[57] ABSTRACT

A method and ink-jet ink composition are provided for reducing crystallization of Acid Yellow 23 anionic dye in ink-jet ink compositions printed on transparencies and glossy media, both film- and paper-based. The method comprises formulating the yellow ink-jet ink composition in accordance with at least one of the following three conditions: (a) a first condition, wherein the yellow ink-jet ink composition includes about 6 to 9 wt % ethylhydroxypropanediol, about 3 to 9 wt % 2-pyrrolidone, and about 3 to 9 wt % diethylene glycol; (b) a second condition, wherein the vehicle of the yellow ink-jet ink includes a buffer in amount sufficient to maintain the pH of the ink-jet ink within the range of about 5 to 7; and (c) a third condition, wherein the cation of the inorganic salt component of the ink-jet ink comprises calcium ions to the substantial exclusion of magnesium ions. While any or all of the foregoing conditions may be implemented to reduce crystallization in the yellow ink, a combination of the three is particularly efficacious. A narrower embodiment also incorporates two alternative techniques, namely reducing the dye load of the yellow ink to no more than about 3.5 wt % and increasing the thickness of the clear polymeric surface coating of the transparency or glossy media to at least about 12 μm from its typical 10 μm. The solution offered by the present method and ink-jet ink composition is easily and inexpensively implemented and does not sacrifice overall print quality.

18 Claims, No Drawings

5,609,674

MITIGATION OF DYE CRYSTALLIZATION IN IMAGES ON TRANSPARENCIES AND GLOSSY MEDIA

TECHNICAL FIELD

The present invention relates to ink-jet printing, and, more particularly, to the reduction of crystallization of the anionic dye Acid Yellow 23 in yellow ink-jet ink compositions forming images on transparencies and glossy media, both film-based and paper-based.

BACKGROUND ART

Ink-jet printing is a non-impact printing process in which droplets of ink are deposited on a print medium in a particular order to form alphanumeric characters, area fills, and other patterns thereon. Low cost and high quality of the output, combined with relatively noise-free operation, have made ink-jet printers a popular alternative to other types of printers used with computers.

The non-impact printing process of ink-jet printing involves the ejection of fine droplets of ink onto a print media such as paper, transparency and opaque film, or textiles in response to electrical signals generated by a microprocessor. There are two basic means currently available for achieving ink droplet ejection ink-jet printing: thermally and piezoelectrically. In thermal ink-jet printing, the energy for drop ejection is generated by electrically heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor.

In commercially-available thermal ink-jet color printers, such as a DeskJet® printer available from Hewlett-Packard Company, a color spectrum is achieved by combining yellow, magenta, cyan, and black inks in various proportions. The yellow, magenta, cyan, and black inks derive their hues from yellow, magenta, cyan, and black colorants, respectively.

Colorants for inks are available in the form of dyes or pigments. Accordingly, ink-jet inks are available as dye-based and/or pigment-based compositions. Of the two, dye-based ink-jet ink compositions are much more widely available. Dye-based ink-jet ink compositions are generally aqueous-based and are formulated by dissolving dye in an ink vehicle. The dye molecules employed in ink-jet ink compositions are often in the form of dye salts made of a dye anion and a cation such as sodium, lithium, or tetramethylammonium (TMA). A limited number of pigment-based ink-jet inks are also available, which generally comprise a pigment dispersed in an aqueous solution by a dispersant. Although pigments offer the very desirable properties of waterfastness and lightfastness, their natural tendency to agglomerate in aqueous media and their lack of uniform size distribution have dampened industry enthusiasm for their employment as ink-jet ink compositions in comparison to dyebased inks.

Good print quality in ink-jet printing is quantified by several different measuring sticks. For example, three desirable qualities in ink-jet ink compositions are waterfastness, lightfastness, and good edge acuity. In addition to these measures of good print quality, ink-jet ink compositions are subject to an additional measuring stick when printed on transparencies or glossy media, both film- and paper-based: clarity. More specifically, it is desirable that an image on a transparency or glossy media be free of cloudiness or haziness, which would naturally go unnoticed for images printed onto non-glossy paper media.

One likely source for undesirable cloudiness or haziness associated with images printed on transparencies or glossy media is crystallization of dye molecules. Such crystallization has been linked to yellow dye-based ink-jet ink compositions containing the anionic dye molecule Acid Yellow 23. For inks containing Acid Yellow 23, a cloudiness or haziness may be observed to develop over time after an image is printed onto a transparency or glossy media. The crystallization of the Acid Yellow 23 dye molecule increases light scattering on transparencies and glossy media, both film- and paper-based, producing a yellow-brown appearance. Moreover, this cloudiness may be observed in any inked areas containing the yellow ink; thus, yellow, red, and green areas each potentially display the problem.

Thus, a need remains for a solution to the problem of crystallization of Acid Yellow 23 anionic dye molecules such that images produced on transparencies and glossy media (both film- and paper-based) with such dye molecules are lucid rather than cloudy or hazy. The solution to the problem of crystallization of Acid Yellow 23 anionic dye molecules should be effective, easily implemented, and inexpensive. Finally, overall print quality should not be sacrificed.

DISCLOSURE OF INVENTION

In accordance with the invention, a method for reducing crystallization of Acid Yellow 23 anionic dyes contained in yellow ink-jet inks printed as images upon transparencies and glossy media (both film-based and paper-based) is provided, along with the resulting yellow ink-jet ink composition. The method comprises formulating a yellow ink-jet ink composition in accordance with at least one of the following three conditions:

(a) a first condition, wherein the vehicle of the yellow ink-jet ink composition includes about 6 to 9 wt % ethylhydroxypropanediol, about 3 to 9 wt % 2-pyrrolidone, and about 3 to 9 wt % diethylene glycol;

(b) a second condition, wherein the vehicle includes a buffer in amount sufficient to maintain the pH of the yellow ink-jet ink within the range of about 5 to 7; and (c) a third condition, wherein the inorganic salt component of the yellow inkjet ink comprises a cation and an anion, the cation comprising calcium ions to the substantial exclusion of magnesium ions.

While any or all of the foregoing conditions may be implemented to reduce crystallization in the yellow ink-jet ink, a combination of the three is particularly efficacious. A narrower embodiment also incorporates two additional techniques for reducing crystallization with any or all of the three conditions above. More specifically, the method preferably also includes reducing the dye load of the yellow ink-jet ink to no more than about 3.5 wt % and increasing the thickness of the surface coating of the transparency or glossy media to at least about 12 µm from its typical 10 µm.

The method and ink-jet composition of the invention achieve reduced crystallization of the Acid Yellow 23 anionic dye. When the ink vehicle is reformulated to the presently disclosed and recommended solvent system, pH, and inorganic salt cation, and when the dye load is appropriately reduced and the coating of the transparency or glossy media is slightly thickened, there is a complete elimination of crystallization of the yellow dye. Therefore, the present method is highly effective. Further, the solution offered by this method is easily and inexpensively implemented and does not sacrifice overall print quality.

BEST MODES FOR CARRYING OUT THE INVENTION

The invention described herein is directed to the reduction of crystallization of the anionic dye molecule Acid Yellow 23 contained in an ink-jet ink printed onto transparencies and glossy media (both film- and paper-based) by an ink-jet printer, such as a DeskJet® printer available from Hewlett-Packard. A method disclosed herein to achieve a reduction in crystallization involves several different options that may be employed alone or in combination to reduce crystallization. Also disclosed is an ink-jet ink composition comprising Acid Yellow 23 that exhibits reduced crystallization.

The method of the present invention comprises formulating the yellow ink-jet ink composition in accordance with at least one of the following three conditions:

(a) a first condition, wherein the vehicle of the yellow ink-jet ink composition includes about 6 to 9 wt % ethylhydroxypropanediol, about 3 to 9 wt % 2-pyrrolidone, and about 3 to 9 wt % diethylene glycol;

(b) a second condition, wherein the vehicle includes a buffer in amount sufficient to maintain the pH of the yellow ink-jet ink within the range of about 5 to 7; and (c) a third condition, wherein the cation of the inorganic salt component of the ink vehicle comprises calcium ions to the substantial exclusion of magnesium ions.

The purity of all components is that employed in normal commercial practice for ink-jet ink compositions. Weight percents represent percent of the total ink composition, unless otherwise indicated.

Once formulation by the selected step is accomplished, the resulting ink-jet ink composition may be printed upon transparencies or glossy media (film-based or paper-based) by an ink-jet printer, whereupon the image created will evidence reduced crystallization of the Acid Yellow 23 dye molecule. Notably, the presently recited ink-jet ink composition incorporates at least one of the preceding three conditions in its formulation. While any or all of the foregoing conditions may be implemented to reduce crystallization in the yellow ink-jet ink, a combination of the three is particularly efficacious.

As an alternative to the above-described means for reducing crystallization, it is noted that a reduction in crystallization may also be achieved by simply reducing the concentration of yellow ink applied to any given area or by reducing the dye load in the yellow ink; however, both of these actions decrease the intensity of the color achieved (i.e., the chroma). As such, yellow areas appear "washed-out" or undesirably light. Additionally, in order to maintain the proper hue angle for red and green areas, the amount of magenta ink or cyan ink which is mixed with the yellow ink must be reduced accordingly, such that these areas also become "washed-out" in appearance.

Another alternative technique that may be used to reduce crystallization of ink-jet inks printed on transparencies and glossy media is to increase the thickness of the solvent-absorbing layer on such print media. This has the effect of reducing the concentration of the dye molecule on the print media in terms of moles per unit volume of coating. It is presumed that, by increasing the thickness of the solvent-absorbing layer, the concentration of the dye molecule is reduced below its solubility limit for that environment, thereby reducing crystallization of the dye. However, increasing the thickness of the solvent-absorbing layer increases the cost of the print media.

The most preferred embodiment of the invention incorporates, in moderation, the two alternative techniques for reducing crystallization with any or all of the three conditions above. Accordingly, the most preferred method of the invention involves incorporating all three conditions directed to the vehicle of the composition as well as reducing the dye load of the yellow ink to no more than about 3.5 wt % and increasing the thickness of the surface coating of the transparency or glossy media.

The dye component specifically benefited in the practice of the present invention is a yellow anionic dye, namely, Acid Yellow 23 anionic dye. This dye, after purification, is combined with an ink vehicle to form an aqueous, dye-based inkjet ink that is employed in ink-jet printing. While the anion of the Acid Yellow 23 dye molecule is typically associated with a sodium cation as available commercially, it is common to treat the dye to replace the sodium cation with tetramethylammonium (TMA), using techniques such as ion-exchange.

Together with the yellow ink composition, magenta, cyan, and black ink compositions are typically provided to form a complete set for use in four-pen color ink-jet printers such as a DeskJet® printer. An example of a specific dye set that may be employed in the practice of the invention to formulate these four inks follows: Direct Blue 199 and Acid Blue 9 (cyan); Reactive Red 180 and Acid Red 52 (magenta); and Acid Yellow 23 (yellow). The accompanying black ink is commonly represented by either a dye-based ink or a pigment-based ink.

It has been determined that Acid Yellow 23 anionic dye-TMA crystallizes once printed onto a print media, which is problematic if a transparency or glossy media is employed. The crystallization of Acid Yellow 23 anionic dye increases light scattering on transparencies and glossy media, both film- and paper-based, thereby producing a hazy appearance. This effect is seen in any inked areas on the transparency or glossy media that contain yellow ink, so that red and green areas of the image are adversely affected along with yellow areas. A typical ink-jet ink composition experiencing such crystallization problems might comprise Acid Yellow 23-TMA; a solvent system comprising 1,5-pentanediol, ethylhydroxypropanediol (EHPD), and 2-pyrrolidone; an inorganic salt such as magnesium nitrate; "other" components such as surfactants, buffers, and biocides; and water. More specifically, an example yellow ink-jet ink formulation that would benefit from the practice of the invention might comprise the following: (a) about 3.8 wt % Acid Yellow 23-TMA; (b) about 7.5 wt % EHPD; (c) about 7.5 wt % 2-pyrrolidone; (d) about 8.0 wt % 1,5-pentanediol; (e) about 4.5 wt % magnesium nitrate; (f) about 2.5 wt % of a surfactant; (g) about 0.2 wt % each of a buffer and a biocide; and (h) the balance water.

In accordance with the invention, the ink vehicle associated with Acid Yellow 23 anionic dye may be re-formulated to reduce the dye's tendency to crystallize. Three approaches may be used either alone or in combination, namely, (1) reformulating the solvent system; (2) maintaining the pH of the yellow ink within a specific range; and (3) employing a specific cation associated with the inorganic component of the ink.

In a first approach, the solvent system of the yellow ink may be re-formulated to achieve reduced crystallization of the Acid Yellow 23 dye molecule. In the practice of the invention, reduced crystallization is achieved for Acid Yellow 23 anionic dye when employed with a solvent system comprising about 6 to 9 wt % EHPD, about 3 to 9 wt % 2-pyrrolidone, and about 3 to 9 wt % diethylene glycol (DEG). More preferably, the solvent system comprises about 7.5 to 8.5 wt % EHPD, about 3 to 5 wt % 2-pyrrolidone, and 3 to 5 wt % diethylene glycol. Most preferably, the solvent system comprises about 7.5 to 8.5 wt % EHPD, about 3.5 to 4.5 2-pyrrolidone, and about 3.5 to 4.5 wt % diethylene glycol. As illustrated in the Examples below, employing a solvent system A comprising 8 wt % EHPD, 4 wt % 2-pyrrolidone, and 4 wt % diethylene glycol results in reduced dye crystallization in comparison to a solvent system B comprising 8 wt % 1,5-pentanediol, 7.5 wt % EHPD and 7.5 wt % 2-pyrrolidone.

In a second approach, the pH of the yellow ink-jet ink composition is maintained within the range of about 5 to 7 by the inclusion of a buffer in the ink vehicle. As demonstrated in the Examples below, a yellow ink-jet ink having a pH of about 7 exhibits less crystallization in imaged areas than ink formulated with a pH of about 8. Buffers employed in the practice of the invention to modulate pH should be organic-based biological buffers, since inorganic buffers would likely precipitate in the presence of the relatively large amount of inorganic salts in the contemplated ink compositions. Examples of preferably-employed buffers include Trizma Base, which is available from, for example, Aldrich Chemical (Milwaukee, Wis.), and 4-morpholine ethane sulfonic acid (MES). Typically, the present yellow ink-jet inks will contain about 0.1 to 1 wt % of a buffer.

In a third approach, the cation associated with the inorganic salt component is calcium rather than magnesium. The inorganic salt component of the present ink vehicle serves to prevent bleed between the black ink and the color inks of an ink set, and comprises one or more inorganic salts, which must be soluble in the ink in the concentration employed. Commonly-employed cations for the inorganic salt include alkaline earth metals of group 2A of the periodic table (e.g., magnesium and calcium); the transition metals of group 3B of the periodic table (e.g., lanthanum); cations from group 3A of the periodic table (e.g., aluminum); and lanthanides (e.g., neodymium), of which calcium and magnesium are the most common choices. Of these two, calcium is preferable to magnesium, since less crystallization of the Acid Yellow 23 dye molecule occurs in the presence of calcium as opposed to magnesium. Suitably-employed anions associated with calcium include nitrate, chloride, acetate, benzoate, formate, and thiocyanate, with nitrate, chloride, and acetate salts of calcium being most preferred. The present yellow ink-jet ink composition preferably employs about 3 to 6 wt % of an inorganic salt having an associated calcium cation, and most preferably employs about 4 to 5 wt % of calcium nitrate.

Of the three above-described approaches to reducing Acid Yellow 23 crystallization, the most effective is employing calcium rather than magnesium ions in the inorganic salt component of the ink, followed by selection of the solvent system. Finally, the least effective approach to reducing crystallization of Acid Yellow 23 is maintaining the pH within the range of about 5 to 7.

By incorporating two alternative techniques for reducing crystallization with any or all of the three approaches described above, one further diminishes the amount of Acid Yellow 23 crystallization. One alternative technique for reducing crystallization involves reducing the dye load of the yellow ink composition. More specifically, the dye load of yellow ink-jet inks commonly ranges up to about 4 wt %. By reducing the maximum dye load to less than about 3.5 wt %, such that the dye load is within the range of about 0.1 to 3.5 wt % in the practice of the invention, an incremental reduction in dye molecule crystallization is observed. Preferably, the dye load is within the range of about 3.0 to 3.5 wt %. Since decreasing the dye load has the effect of decreasing the intensity of the color achieved, it is contemplated in the practice of the invention that the dye load be only slightly decreased and that other approaches, such as reformulation of the solvent system, be concurrently practiced to effect a reduction in crystallization.

Another alternative technique for reducing crystallization involves increasing the thickness of the surface coating of the transparency or glossy media. An example of transparency film is HP Premium Transparency Film™, commercially available from Hewlett-Packard Company. An example of glossy paper is HP Premium Glossy Paper™, also available from Hewlett-Packard Company.

Typically, such transparencies and glossy media are coated with a solvent-absorbing layer. By increasing the thickness of the solvent-absorbing layer, one effectively reduces the concentration of the dye molecule on the film or paper substrate in terms of moles per unit volume of coating. It is surmised that crystallization is averted with an increase in layer thickness by reducing the concentration of the dye molecule to below its solubility limit. Since greatly increasing the thickness of the solvent-absorbing layer would have noticeable impact on the cost of the print media, it is economically prudent to effect a modest increase in the thickness of the solvent-absorbing layer combined with another approach to reducing crystallization of the dye molecule. Accordingly, whereas such layers are typically about 10 µ thick, a modest increase in thickness to at least about 12 µm is contemplated in the practice of the invention. The thickness of the solvent-absorbing layer is controlled by placing excess coating onto a web of the film or paper substrate, and then scraping off the excess coating by passing the coated web under some kind of rod or blade. The coating thickness can be adjusted by widening or narrowing the gap between the moving web and the rod or blade.

In practice, it is observed that by employing the preferred solvent system, cation, and pH, combined with a slightly reduced dye load in the yellow ink as well as a slightly thicker coating on the transparency or glossy media, crystallization of the Acid Yellow 23 dye molecule is completely eliminated.

Other components that may be present in the yellow ink-jet ink composition, aside from the above-described solvent system, buffers, and inorganic salts, include surfactants, biocides, and the like. Such components are commonly employed additives in ink-jet ink compositions.

With particular regard to the surfactant component, one well-known purpose of the surfactant is to prevent color to color bleed by increasing the penetration of the inks into the print medium. Surfactants may also be employed to create a substantially uniform surface energy in the ink, thereby reducing the occurrence of mis-directed drops; due to puddling of ink on the nozzle plate. Examples of classes of surfactants that are preferably employed in the present ink compositions include anionic surfactants and nonionic surfactants.

Any of the biocides commonly employed in ink-jet inks may be employed in the ink of the present invention, such as NUOSEPT 95, available from Hüls America (Piscataway, N.J.); PROXEL GXL, available from ICI America (Wilmington, Del.); and glutaraldehyde, available from Union Carbide Company (Bound Brock, N.J.) under the trade designation UCARCIDE 250. PROXEL GXL is the preferred biocide. The present yellow ink-jet inks may contain up to about 0.3 wt % of a biocide.

Finally, another optional component that may be employed in the practice of the present invention is ammonium nitrate, which may be used in conjunction with calcium-containing inorganic salts. Ammonium nitrate serves to prevent the precipitation of such calcium-containing inorganic salts in the ink upon exposure to the carbon dioxide in the air.

Most preferably, the yellow ink is prepared according to the following formulation and is buffered to a pH of about 6.5:

(a) about 3.0 to 3.5.wt % of Acid Yellow 23-TMA;

compositions of these inks are presented in the table below. Each of the inks was printed using a DeskJet®850 thermal ink-jet printer onto HP Premium Transparency Film™. After a period of time ranging from about 3 to 20 days, the image printed by each ink was studied so that a determination of the relative crystallization of the inks could be made. These results are also reported in the Table below. More specifically, the inks are presented in order of degree of crystallization, with the ink having the highest degree of crystallization presented in Col. 1 and the ink having the lowest degree of crystallization presented in Col. 7.

TABLE 1

COMPARISON OF DEGREE OF CRYSTALLIZATION FOR VARIOUS INKS
(All values in weight percent, unless indicated otherwise.)

| Component or Property | 1 | 2 | 3 | 4 | 5 | 6 | 7 |
|---|---|---|---|---|---|---|---|
| AY 23[1] | 3.8 | 3.8 | 3.8 | 3.8 | 3.0 | 3.8 | 3.0 |
| EHPD[2] | 7.5 | 7.5 | 8.0 | 7.5 | 7.5 | 7.5 | 8.0 |
| 2-Pyrrolidone | 7.5 | 7.5 | 4.0 | 7.5 | 7.5 | 7.5 | 4.0 |
| Diethylene Glycol | — | — | 4.0 | — | — | — | 4.0 |
| 1,5-Pentanediol | 8.0 | 8.0 | — | 8.0 | 8.0 | 8.0 | — |
| $Ca(NO_3)_2$ | — | — | — | — | — | 4.5 | 4.5 |
| $Mg(NO_3)_2$ | 4.5 | 4.5 | 4.5 | 4.5 | 4.5 | — | — |
| Nonionic Surfactant | 2.5 | 2.5 | 2.5 | 2.5 | 2.5 | 2.5 | 2.5 |
| Trizma base | 0.2 | 0.2 | 0.2 | 0.2 | 0.2 | 0.2 | 0.2 |
| Proxel GXL | 0.2 | 0.2 | 0.2 | 0.2 | 0.2 | 0.2 | 0.2 |
| Water | balance | balance | balance | balance | balance | balance | balance |
| pH | 8 | 7 | 8 | 8 | 8 | 8 | 7 |
| Media Coating Thickness, μm | 10 | 10 | 10 | 12 | 10 | 10 | 12 |
| Relative Tendency to Crystallize | 1 (high) | 2 | 3 | 4 | 5 | 6 | 7 (low) |

Notes:
[1] Acid Yellow 23 dye
[2] ethylhydroxypropanediol (b) about 7.5 to 8.5 wt % EHPD;

(c) about 3.5 to 4.5 wt % 2-pyrrolidone;

(d) about 3.5 to 4.5 wt % diethylene glycol;

(e) about 4 to 5 wt % calcium nitrate;

(f) up to about 4 wt % of at least one surfactant, preferably an anionic surfactant or a nonionic surfactant;

(g) about 0.1 to 1 wt % of a buffer, preferably Trizma base or MES;

(h) up to about 0.3 wt % of a biocide, preferably PROXEL GXL; and (i) the balance water.

By formulating the above yellow ink and printing the same on a transparency or glossy media having a coating thickness increased from 10 μm to at least about 12 μm, crystallization of the Acid Yellow 23 dye molecule will have been completely eradicated.

The advantages realized in these various approaches of reducing crystallization of the Acid Yellow 23 dye molecule, both singularly and in combination, are illustrated by the following examples.

EXAMPLES

A series of seven inks were prepared to illustrate the benefits achieved in the practice of the invention. The Therefore, based upon the results in Table 1, it is concluded that single variable changes of solvent system, dye load, pH, cation, and coating thickness each incrementally reduce crystallization compared to the base ink composition in Col. 1. However, crystallization appeared to be completely eliminated when all of the changes were incorporated in a single ink, as in Col. 7.

Thus, it has been demonstrated that the crystallization of the Acid Yellow 23 dye molecule can be reduced by easily implemented changes in ink composition and media coating thickness. Moreover, it has been demonstrated that the complete eradication of crystallization can be achieved by incorporating each of the five suggested changes, namely, (1) reformulation of the solvent system; (2) use of calcium rather than magnesium in the inorganic salt component; (3) maintenance of the pH of the ink at no more than about 7; (4) slight reduction of the dye load in the ink; and (5) employment of a slightly thicker coating on the transparency or glossy media.

INDUSTRIAL APPLICABILITY

The present method and ink composition disclosed herein for achieving reduced crystallization of the Acid Yellow 23 anionic dye molecule in ink-jet printing onto transparencies and glossy media, both film-based and paper-based, are expected to find commercial use in thermal ink-jet color printing.

Thus, there has been disclosed herein a method and ink-jet ink composition for reducing crystallization of the Acid Yellow 23 anionic dye molecule otherwise experienced when an ink-jet ink composition containing Acid Yellow 23 is ink-jet printed onto transparencies and glossy media, both film-based and paper-based. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. A method for reducing crystallization of yellow ink-jet ink printed by an ink-jet printer on a print media having a clear polymer-based surface coating thereon, said clear polymer-based surface coating having a measurable thickness, said yellow ink-jet ink comprising Acid Yellow 23 anionic dye and a vehicle, said vehicle including an inorganic salt comprising a cation and an anion and said yellow ink-jet ink having a measurable pH, said method comprising:
   (a) formulating said yellow ink-jet ink in accordance with at least one of the following conditions:
      (i) a first condition, wherein said vehicle is formulated such that said yellow ink-jet ink includes about 6 to 9 wt % ethylhydroxypropanediol, about 3 to 9 wt % 2-pyrrolidone, and about 3 to 9 wt % diethylene glycol,
      (ii) a second condition, wherein said vehicle is formulated to include a buffer in amount sufficient to maintain said pH of said yellow ink-jet ink within the range of about 5 to 7, and
      (iii) a third condition, wherein said vehicle is formulated such that said cation of said inorganic salt comprises calcium ions to the substantial exclusion of magnesium ions.

2. The method of claim 1 further comprising steps (b) and (c) as follows:
   (b) formulating said yellow ink-jet ink to comprise no more than about 3.5 wt % of said Acid Yellow 23 anionic dye; and
   (c) increasing the thickness of said clear polymer-based surface coating of said print media to at least about 12 μm.

3. The method of claim 1 wherein said vehicle of said first condition comprises about 7.5 to 8.5 wt % ethylhydroxypropanediol, about 3 to 5 wt % 2-pyrrolidone, and about 3 to 5 wt % diethylene glycol.

4. The method of claim 1 wherein said buffer of said second condition is present in amount sufficient to maintain said pH of said yellow ink-jet ink at about 6.5.

5. The method of claim 1 wherein said inorganic salt of said third condition consists essentially of calcium nitrate.

6. The method of claim 1 wherein said vehicle is formulated to comprise:
   (a) about 6 to 9 wt % ethylhydroxypropanediol;
   (b) about 3 to 9 wt % 2-pyrrolidone;
   (c) about 3 to 9 wt % diethylene glycol;
   (d) about 0.1 to 1 wt % of a buffer such that said pH is maintained within the range of about 5 to 7;
   (e) about 3 to 6 wt % of said inorganic salt, said cation component of said inorganic salt comprising calcium ions to the substantial exclusion of magnesium ions;
   (f) up to about 4 wt % surfactant;
   (g) up to about 0.3 wt % biocide; and
   (h) the balance water.

7. The method of claim 2 wherein said method comprises the steps of:
   (a) formulating said yellow ink-jet ink to comprise:
      (i) about 0.1 to 3.5 wt % Acid Yellow 23-TMA,
      (ii) about 6 to 9 wt % ethylhydroxypropanediol,
      (iii) about 3 to 9 wt % 2-pyrrolidone,
      (iv) about 3 to 9 wt % diethylene glycol,
      (v) about 0.1 to 1 wt % of a buffer such that said pH is maintained within the range of about 5 to 7,
      (vi) about 3 to 6 wt % inorganic salt wherein said cation component of said inorganic salt comprises calcium ions to the substantial exclusion of magnesium ions,
      (vii) up to about 4 wt % surfactant,
      (viii) up to about 0.3 wt % biocide, and
      (ix) the balance water; and
   (b) increasing said thickness of said clear polymer-based surface coating of said print media to at least about 12 μm.

8. The method of claim 7 wherein said method comprises the steps of:
   (a) formulating said ink-jet ink to comprise:
      (i) about 0.1 to 3.5 wt % Acid Yellow 23-TMA anionic dye,
      (ii) about 7.5 to 8.5 wt % ethylhydroxypropanediol,
      (iii) about 3 to 5 wt % 2-pyrrolidone,
      (iv) about 3 to 5 wt % diethylene glycol,
      (v) about 0.1 to 1 wt % of a buffer such that said pH is maintained within the range of about 5 to 7,
      (vi) about 4 to 5 wt % calcium nitrate,
      (vii) up to about 4 wt % surfactant,
      (viii) up to about 0.3 wt % biocide, and
      (ix) the balance water; and
   (b) increasing said thickness of said clear polymer-based coating of said film-based media to about 12 μm.

9. A yellow ink-jet ink composition exhibiting reduced crystallization when printed by an ink-jet printer as an image on a print medium having a clear polymer-based surface coating thereon, said clear polymer-based surface coating having a measurable thickness, said yellow ink-jet ink composition comprising Acid Yellow 23 anionic dye and a vehicle, said vehicle including an inorganic salt comprising an anion and a cation and said yellow ink-jet ink having a measurable pH, said yellow ink-jet ink composition meeting at least one of the following conditions:
   (a) a first condition, wherein said vehicle of said yellow ink-jet ink composition includes, in weight percentage of said yellow ink-jet ink composition, about 6 to 9 wt % ethylhydroxypropanediol, about 3 to 9 wt % 2-pyrrolidone, and about 3 to 9 wt % diethylene glycol;
   (b) a second condition, wherein said vehicle includes a buffer in amount sufficient to maintain said pH of said yellow ink-jet ink within the range of about 5 to 7; and
   (c) a third condition, wherein said cation of said inorganic salt comprises calcium ions to the substantial exclusion of magnesium ions.

10. The yellow ink-jet ink composition of claim 9 wherein said Acid Yellow 23 anionic dye is present in said yellow ink-jet ink composition in an amount not exceeding about 3.5 wt %.

11. The yellow ink-jet ink composition of claim 9 wherein said vehicle of said first condition comprises about 7.5 to 8.5 wt % ethylhydroxypropanediol, about 3 to 5 wt % 2-pyrrolidone, and about 3 to 5 wt % diethylene glycol.

12. The yellow ink-jet ink composition of claim 9 wherein said buffer of said second condition is present in amount sufficient to maintain said pH of said ink-jet ink at about 6.5.

13. The yellow ink-jet ink composition of claim 9 wherein said inorganic salt of said third condition consists essentially of calcium nitrate.

14. The yellow ink-jet ink composition of claim 9 wherein said vehicle comprises, in weight percentage of said yellow ink-jet ink composition:
   (a) about 6 to 9 wt % ethylhydroxypropanediol;
   (b) about 3 to 9 wt % 2-pyrrolidone;
   (c) about 3 to 9 wt % diethylene glycol;
   (d) about 0.1 to 1 wt % of a buffer such that said pH is maintained within the range of about 5 to 7;
   (e) about 3 to 6 wt % inorganic salt wherein said cation component of said inorganic salt comprises calcium ions to the substantial exclusion of magnesium ions;
   (f) up to about 4 wt % surfactant;
   (g) up to about 0.3 wt % biocide; and
   (h) the balance water.

15. The yellow ink-jet ink composition of claim 10 comprising:
   (a) about 0.1 to 3.5 wt % Acid Yellow 23-TMA;
   (b) about 6 to 9 wt % ethylhydroxypropanediol;
   (c) about 3 to 9 wt % 2-pyrrolidone;
   (d) about 3 to 9 wt % diethylene glycol;
   (e) about 0.1 to 1 wt % of a buffer such that said pH is maintained within the range of about 5 to 7;
   (f) about 3 to 6 wt % inorganic salt wherein said cation component comprises calcium ions to the substantial exclusion of magnesium ions;
   (g) up to about 4 wt % surfactant;
   (h) up to about 0.3 wt % biocide; and
   (i) the balance water.

16. The yellow ink-jet ink composition of claim 15 comprising:
   (a) about 0.1 to 3.5 wt % Acid Yellow 23-TMA anionic dye,
   (b) about 7.5 to 8.5 wt % ethylhydroxypropanediol,
   (c) about 3 to 5 wt % 2-pyrrolidone,
   (d) about 3 to 5 wt % diethylene glycol,
   (e) about 0.1 to 1 wt % of a buffer such that said pH is maintained within the range of about 5 to 7,
   (f) about 4 to 5 wt % calcium nitrate,
   (g) up to about 4 wt % surfactant,
   (h) up to about 0.3 wt % biocide, and
   (i) the balance water.

17. A method for reducing crystallization of yellow ink-jet ink primed by an ink-jet printer on a print media having a clear polymer-based surface coating thereon, said clear polymer-based surface coating having a measurable thickness, said yellow ink-jet ink comprising Acid Yellow 23 anionic dye and a vehicle, said vehicle including an inorganic salt comprising a cation and an anion and said yellow ink-jet ink having a measurable pH, said method comprising:
   (a) formulating said yellow ink-jet ink in accordance with at least one of the following conditions:
      (i) a first condition, wherein said vehicle is formulated such that said yellow ink-jet ink includes about 6 to 9 wt % ethylhydroxypropanediol, about 3 to 9 wt % 2-pyrrolidone, and about 3 to 9 wt % diethylene glycol, and
      (ii) a second condition, wherein said vehicle is formulated such that said cation of said inorganic salt comprises calcium ions to the substantial exclusion of magnesium ions.

18. A yellow ink jet ink composition exhibiting reduced crystallization when primed by an ink-jet printer as an image on a print medium having a clear polymer-based surface coating thereon, said clear polymer-based surface coating having a measurable thickness, said yellow ink-jet ink composition comprising Acid Yellow 23 anionic dye and a vehicle, said vehicle including an inorganic salt comprising an anion and a cation and said yellow ink-jet ink having a measurable pH, said yellow ink-jet ink composition meeting at least one of the following conditions:
   (a) a first condition, wherein said vehicle of said yellow ink-jet ink composition includes, in weight percentage of said yellow ink-jet ink composition, about 6 to 9 wt % ethylhydroxypropanediol, about 3 to 9 wt % 2-pyrrolidone, and about 3 to 9 wt % diethylene glycol; and
   (b) a second condition, wherein said cation of said inorganic salt comprises calcium ions to the substantial exclusion of magnesium ions.

* * * * *